(12) United States Patent
Bruder

(10) Patent No.: US 6,857,687 B2
(45) Date of Patent: Feb. 22, 2005

(54) HARDTOP VEHICLE ROOF WITH THREE RIGID ROOF PARTS

(75) Inventor: Ing Gernot Bruder, Karlsruhe (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/783,874

(22) Filed: Feb. 20, 2004

(65) Prior Publication Data

US 2004/0195859 A1 Oct. 7, 2004

(30) Foreign Application Priority Data

Apr. 7, 2003 (DE) .......................................... 103 16 027

(51) Int. Cl.[7] .................................................. B60J 7/08
(52) U.S. Cl. .................................................... 296/108
(58) Field of Search ........................ 296/107.08, 107.17, 296/108

(56) References Cited

U.S. PATENT DOCUMENTS

| | | | |
|---|---|---|---|
| 6,767,045 B2 * | 7/2004 | Reinsch ................. | 296/107.17 |
| 2003/0085587 A1 * | 5/2003 | Reinsch ................. | 296/107.17 |
| 2004/0108748 A1 * | 6/2004 | Obendiek et al. ........... | 296/108 |

FOREIGN PATENT DOCUMENTS

| | | |
|---|---|---|
| DE | 196 42 152.7 | 4/1998 |
| DE | 100 06 296 | 5/2001 |

* cited by examiner

*Primary Examiner*—Lori L. Coletta
(74) *Attorney, Agent, or Firm*—Klaus J. Bach

(57) ABSTRACT

In a hardtop vehicle roof comprising front, intermediate, and rear roof parts, which are movable between a closed position, in which they cover an interior vehicle space, and an open position, in which they are stacked in a storage compartment of the vehicle, and wherein the front and rear roof parts are supported on the intermediate roof part by a roof part operating mechanism, which is operatively connected to a support and operating mechanism by which the intermediate roof part is mounted on the body of the vehicle, the roof parts operating mechanisms for the front and rear roof parts are operatively connected to the support and operating mechanism of the intermediate part such that, when the roof is opened, the front and rear roof parts are moved on top of the intermediate roof part to form a packet in which the top sides of all roof parts face upwardly and which requires relatively little space on top of the vehicle and does not intrude in the vehicle interior during the transfer between the closed and the open positions.

18 Claims, 6 Drawing Sheets

HARDTOP VEHICLE ROOF WITH THREE RIGID ROOF PARTS

BACKGROUND OF THE INVENTION

The invention relates to a hardtop vehicle roof with three rigid roof parts which are interconnected and are movable between a closed position, in which they cover, disposed one behind another, an interior vehicle space, and an open position, in which they are in a storage position remote from the interior vehicle space. The roof parts are supported by an operating mechanism which is mounted on the vehicle body and linked to the intermediate roof part to which the front and rear roof parts are linked and operated such that, in the storage position, the front and rear roof parts are disposed on top of one another and on top of the intermediate roof part.

Such hard top vehicle roofs are known from DE 100 06 296C1. They can be moved from their closed positions, in which they cover the interior of a vehicle, to a storage position, in which the roof parts are combined to a roof part packet, wherein the front roof part and the rear roof part are disposed on top of the intermediate roof part on which the front and the rear roof parts are supported by way of a lever operating mechanism which is mounted on the vehicle body. In the packet of the roof parts, the intermediate roof part is disposed between the front and rear roof parts wherein either the front or the rear roof part is disposed below the intermediate roof part. The common drive for the vehicle roof or rather the roof parts occurs by way of the intermediate roof part which is supported by an operating mechanism mounted to the vehicle body. The operating mechanism comprises a four-link operating mechanism whose one arm is a driven control arm from which the drive for one of the operating structures is derived by way of a drive arm which itself is part of an operating mechanism in the form of a four-link structure. The four link structure is arranged in the transition area to the rear roof part. The other arm of the four link operating mechanism forms the drive for the operating mechanism associated the front control arm, which is also formed by a four-link operating mechanism. A roof section arrangement of this type is intended particularly in connection with station wagons or SUV's and is specifically adapted to the space conditions presented thereby.

Another hardtop vehicle roof is known from DE 196 42 152A1, wherein, in the closed position of the roof, the roof parts are disposed adjacent one another and, in the open position the roof parts are stacked in a roof part packet, in which the roof parts are disposed on top of one another and stored as a packet in a rear storage compartment. The rear roof part is pivotally mounted to the vehicle body; the front and the intermediate roof part are linked to the respective adjacent roof part by an operating mechanism. In the roof part packet, the intermediate roof part is disposed below the rear roof part and the front roof part is disposed below the intermediate roof part.

For the transfer of the vehicle roof into the storage position, the vehicle roof is pivoted open with the roof parts remaining in their position relative to each other and only then is the roof parts packet formed in that the front and intermediate roof parts are pivoted concurrently relative to each other and under the rear roof part while their relative orientations are maintained. For the movement of the roof parts relative to one another and the movement of the roof to its storage position, a common drive is provided, wherein the drives for the operating mechanisms interconnecting the roof parts are branched off from the rear roof part operating arm drive mechanism by way of which the whole roof is supported. Inspite of the high kinematic and control mechanism expenditures, the possibilities of influencing the roof movements are very limited. At the same time, the operating mechanisms must be very rigid and the operating arms, which are subjected because of the wide extension of the roof during the transfer, must be very sturdy as the roof is raised with the parts aligned before the roof parts can be broken down into a packet.

It is the object of the present invention to provide a hardtop vehicle roof of the type referred to above which however is highly flexible with regard to its adjustability and whose operating mechanism is quite compact and requires relatively little space without invading the interior vehicle space during opening and closing of the vehicle roof.

SUMMARY OF THE INVENTION

In a hardtop vehicle roof comprising front, intermediate, and rear roof parts, which are movable between a closed position, in which they cover an interior vehicle space, and an open position, in which they are stacked in a storage compartment of the vehicle, and wherein the front and rear roof parts are supported on the intermediate roof part by a roof part operating mechanism, which is operatively connected to a support and operating mechanism by which the intermediate roof part is mounted on the body of the vehicle, the roof parts operating mechanisms for the front and rear roof parts are operatively connected to the support and operating mechanism of the intermediate part such that, when the roof is opened, the front and rear roof parts are moved on top of the intermediate roof part to form a packet in which the top sides of all roof parts face upwardly and which requires relatively little space on top of the vehicle and does not intrude in the vehicle interior during the transfer between the closed and the open positions.

With the arrangement according to the invention, the front and rear roof parts can be moved in position while the intermediate roof part is moved relative to the vehicle body without the need for substantially raising the intermediate roof part and without any intrusion of any roof part into the vehicle interior during the movement of the roof parts relative to each other and relative to the vehicle body. The roof packet is formed during movement of the roof parts into the storage position so that, notwithstanding the stacking of the roof parts on top of the intermediate roof part, also the space requirements above the vehicle during the opening or closing of the roof are relatively small. Furthermore, the operating and drive linkages are relatively simple.

The provision of an arm drive arrangement in the connection between the driven operating mechanism and the operating mechanisms to be driven also provides for a large margin for the timing of the movements without large expenditures.

The movements of the roof parts can be influenced particularly by transmission arrangements for the support arm operating mechanisms in the transition from the operating arm drive. These transmission arrangements can be different for the front roof part and the rear roof part which provides for an even greater margin with regard to a control of the movements of the roof parts. It may be expedient in connection with the invention to provide for the drive on one side a four-link operating mechanism and on the other a five-link operating mechanism. With regard to the stacking of the roof such that the rear roof part is disposed above the front roof part, it is expedient to provide the rear roof part with a four-link operating mechanism and the front roof part with a five-link operating mechanism. With the arrangement according to the invention, the roof parts can be tightly stacked on top of one another and the upper rear roof part can be used to hold the roof parts in firm engagement with one another.

Below, embodiments of the invention will be described in detail on the basis of the accompanying drawings.

BRIEF DESCRIPTION OF THE DRAWINGS

FIG. 11 shows the operating mechanism with the roof in a closed position wherein only the left side operating mechanism is shown, the right side being the same, mirror reversed. The left roof part is partially cut off so that the operating mechanism is visible.

DESCRIPTION OF AN EMBODIMENT OF THE INVENTIONS

Figure 1:
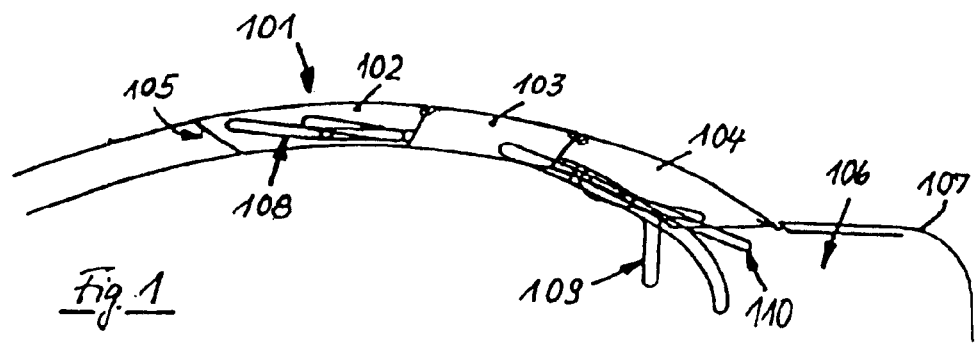
FIG. 1 is a schematic side view of a hardtop vehicle roof with three rigid roof parts in a closed position.

FIG. 1 shows a hardtop vehicle roof 101, which comprises a front roof part 102, an intermediate roof part 103 and a rear roof part 104, which are all rigid and are arranged, in the shown closed position of the roof, one next to another in a common roof plane. In the shown closed position, the front roof part 102 engages the windshield frame 105. The rear roof part 104 is disposed adjacent a rear lid 107, which covers a storage space 106 of the vehicle body 100 for receiving the vehicle roof 101, the storage space 106 being formed by the trunk or part of the trunk of the vehicle.

The intermediate roof part 103 is connected to the front roof part 102 and the rear roof part 104, each by way of a roof part operating mechanism 108, and respectively 110, and is supported on the vehicle body 100, by way of a support arm operating mechanism 109. The operating mechanisms 108 to 110 are in the embodiment shown four-link operating mechanisms and are interconnected so as to provide for the movement of the roof parts 102–104 relative to each other and the common movement with respect to the vehicle body 100.

Figure 2:
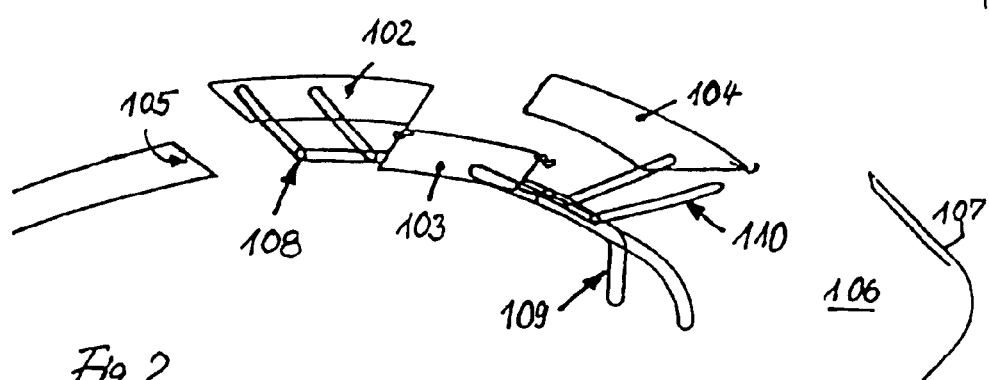
FIGS. 2–5 show the vehicle roof of FIG. 1, in various intermediate positions during the transfer of the roof from the closed to the storage position.

FIG. 2 shows the vehicle roof in the beginning stage of the opening movement during the transfer from the closed to the open position: The lid 107 is pivoted open about a rear pivot axis so that a passage is provided for the roof 101 into the storage space 106.

For the description for the opening of the movement of the roof 101 on the basis of FIGS. 2 to 6, it is assumed that the intermediate roof part 103, which is directly supported by the vehicle body 100, remains stationary while the front and rear roof parts 102 and 104 are raised by the respective roof part operating mechanisms 108 and 110 relative to the intermediate roof part 103 and moved to positions above the intermediate roof part 103.

Figure 3A:
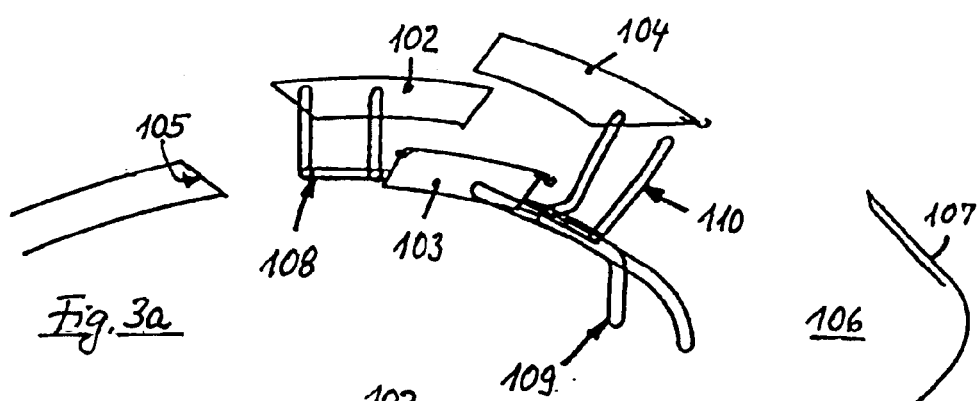
Figure 3B:
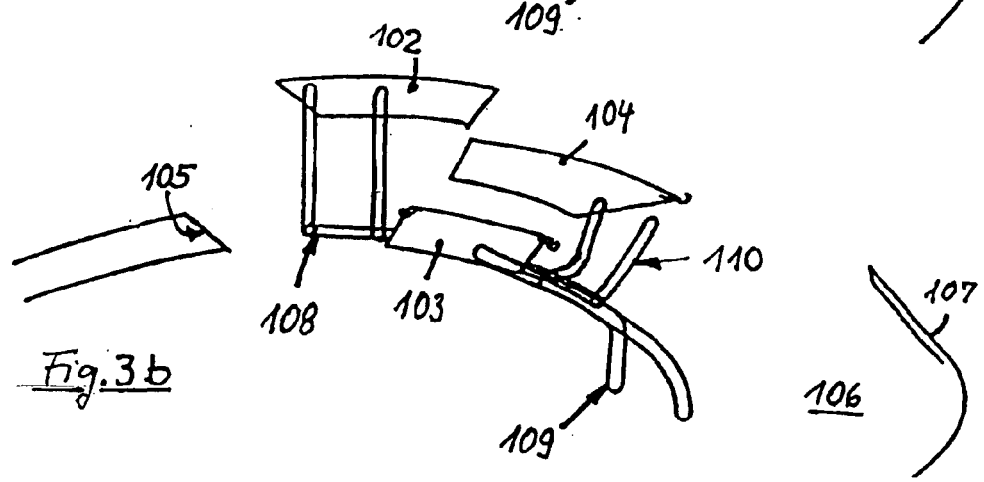

As apparent particularly from FIG. 3 for reaching the stacked position, in which the roof parts 102 to 104 are disposed on top of one another, the front roof part 102 is moved directly above the intermediate roof part 103 and the rear roof part 104 is moved in a position immediately above the front roof part 102. In the roof packet formed in this way accordingly the intermediate roof part 103 is disposed at the bottom and the front roof part 102 is disposed between the intermediate roof part 103 and the rear roof part 104, which is disposed on top.

However, the roof part packet could also be formed by a stacking wherein the rear roof part is disposed between the intermediate roof part and the front roof part which could be achieved with basically the same that is a correspondingly adapted roof part operating mechanisms.

Figure 4:
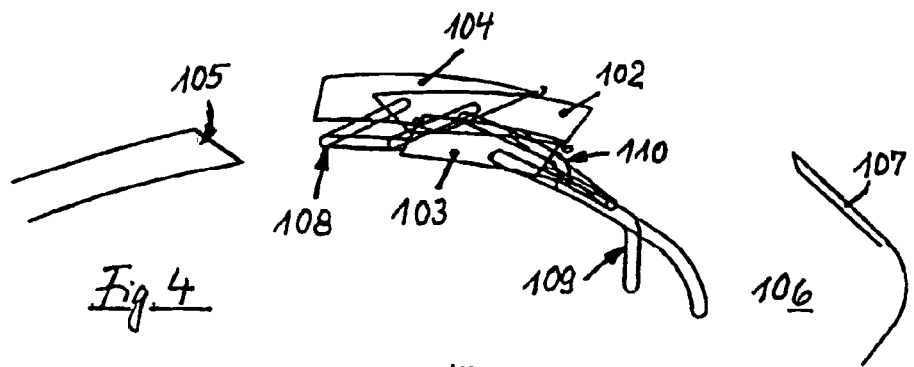
Figure 5:
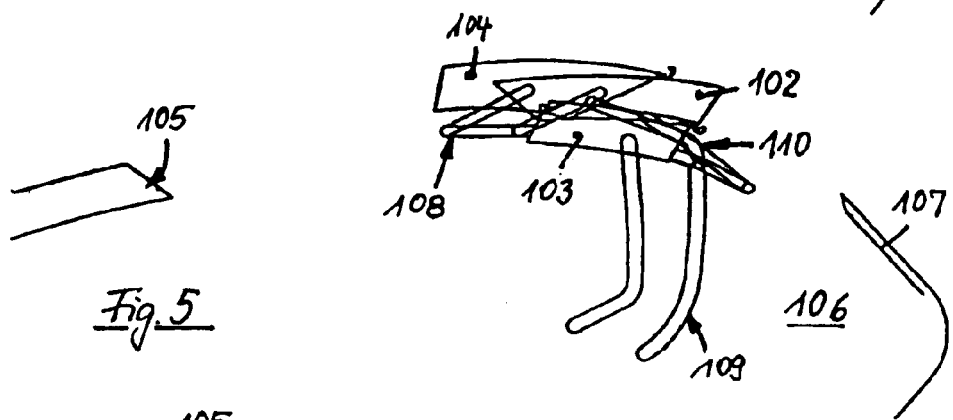
Figure 6:
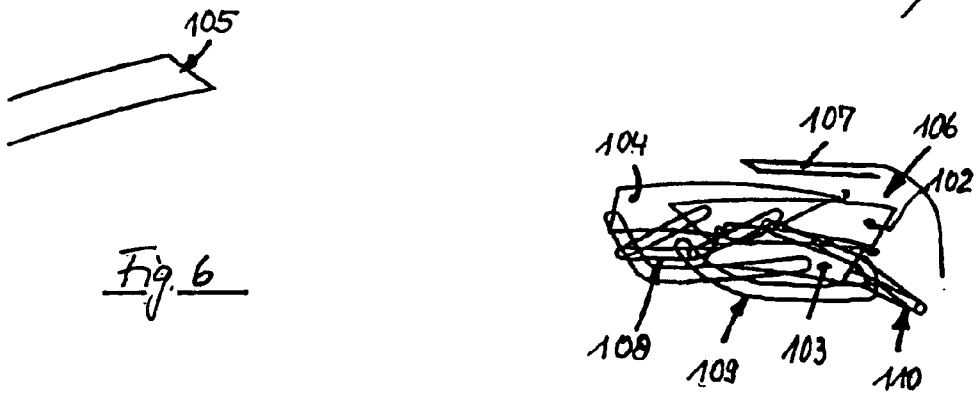
FIG. 6 shows the vehicle roof in its storage position behind the interior vehicle space.

The intermediate position in which the roof parts 102–104 are combined in a roof part packet is shown in FIG. 4. Starting with FIG. 4, FIGS. 5 and 6 show the movement of the roof part packet into the storage space 106 while the orientation of the roof parts in the packet is maintained. The roof parts 102 to 104 are moved while the upwardly facing roof part top position is maintained.

FIG. 6 shows the roof parts packet deposited in the storage space 106 with the rear lid 107 again closed over the packet.

Figure 7:
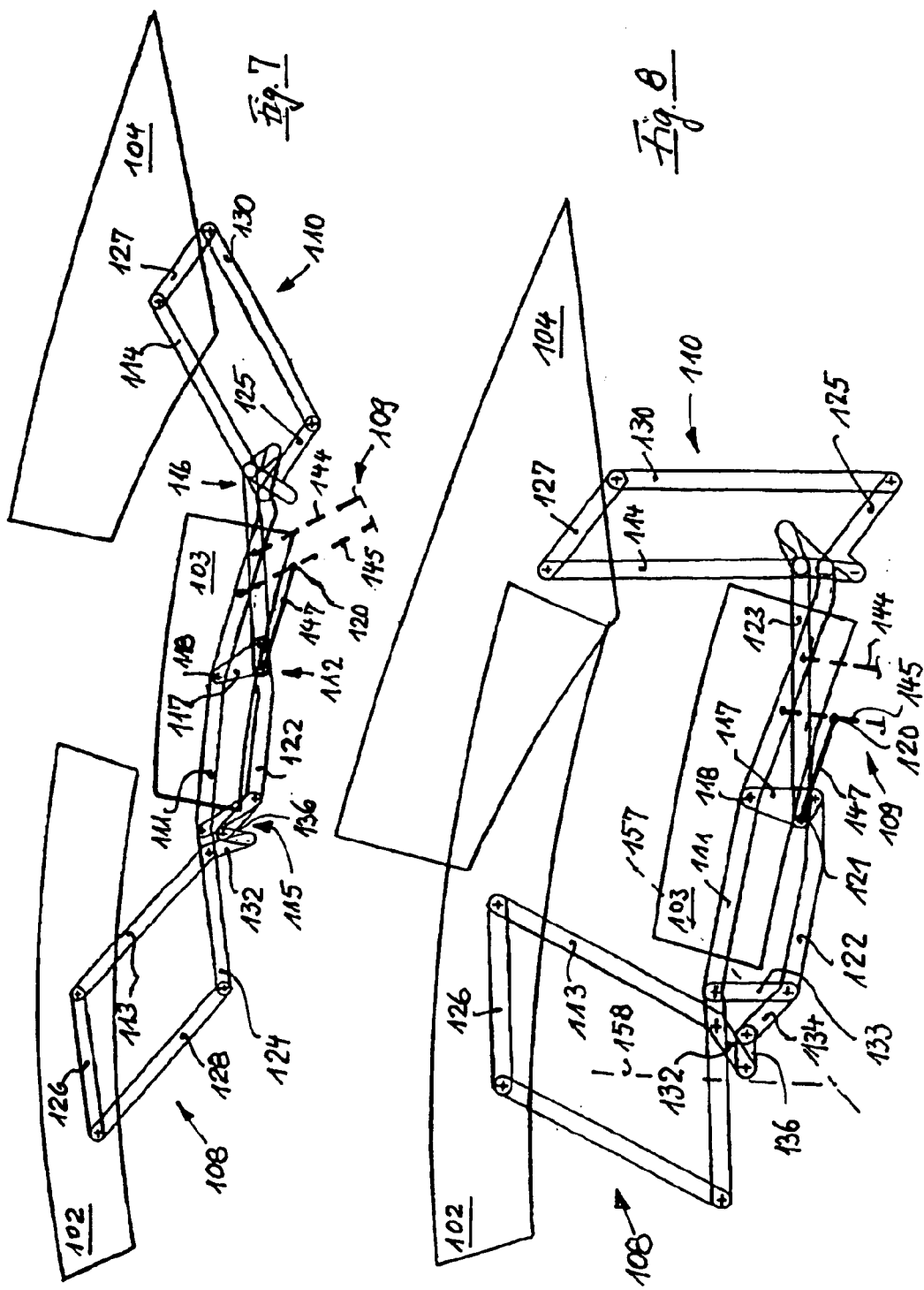
FIGS. 7 and 8 show the roof schematically in various intermediate positions with the operating mechanisms disposed in the transition areas between the roof parts. In a highly reduced representation also the operating arm drive mechanism is shown by way of which the intermediate roof part is connected to the vehicle body. This operating arm drive mechanism provides for the movement of the roof and of the roof parts relative to one another.
Figure 8:
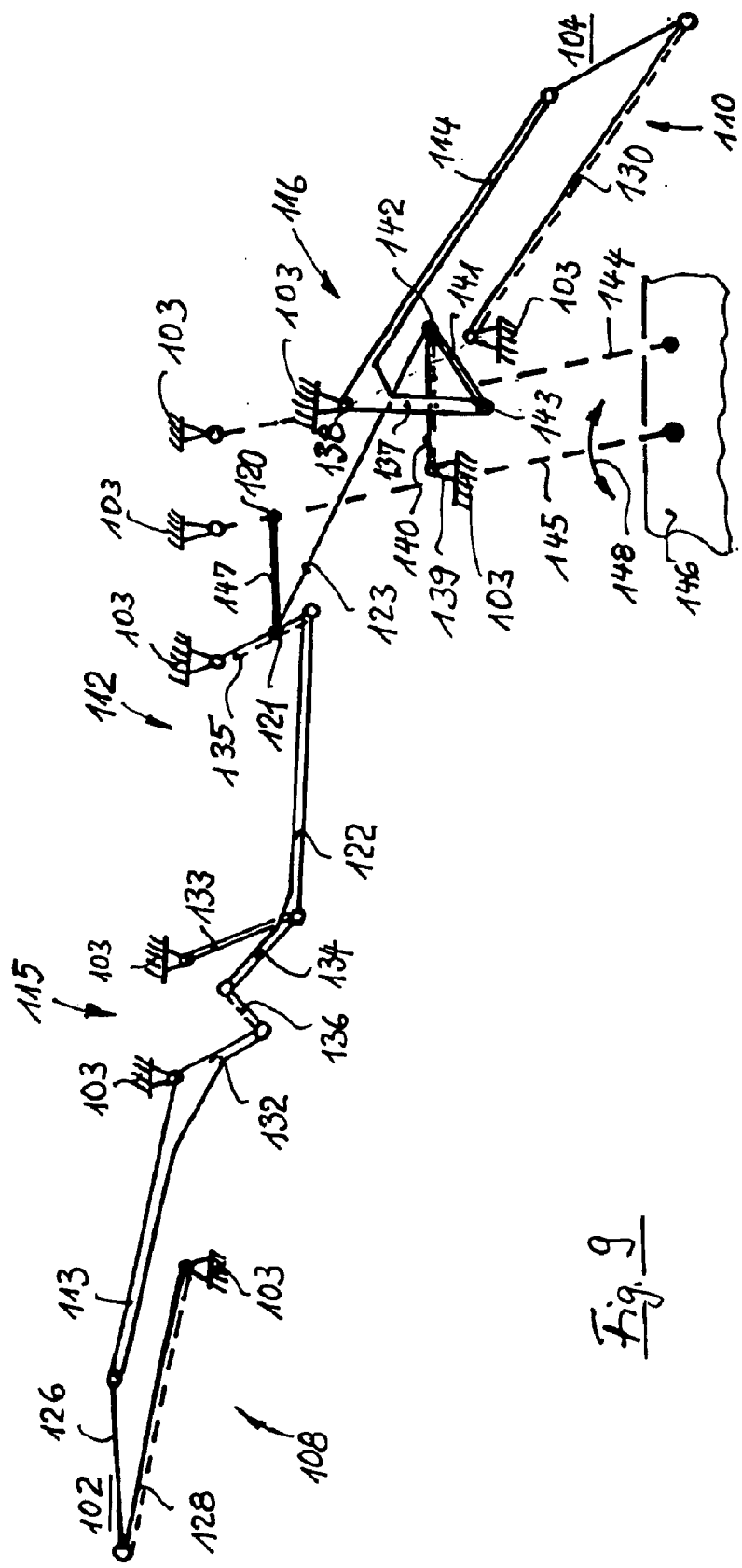

In principle, based on such a roof design, in which the roof parts 102 to 104 can be stacked to form a roof packet, FIGS. 7 and 8 show suitable roof part operating mechanisms 108 and 110 for supporting the front and rear roof parts 102 and 104 on the intermediate roof part 103 and schematically a support arm operating mechanism 109, which supports the intermediate roof part 103 on the vehicle body and which is actuated for the displacement of the vehicle roof 101. The operating mechanisms 108 and 110 for the front and the rear roof parts are interlinked with the support arm operating mechanism 109 of the intermediate roof part 203 such that the front and the rear roof parts 102, 104 are moved with respect to the rear roof part 103 at the same time when the intermediate roof part 103 is moved relative to the vehicle body 110. As a result, the roof part packet of the roof parts 102–104 is formed as the intermediate roof part 103 is being moved backwardly toward the storage space of the roof and the stacked roof parts 102–104 are then moved together into the storage space in the rear part of the vehicle body 100. The support arm operating mechanism 109 for the intermediate roof part 103 is shown in FIGS. 7 and 8 only schematically by dashed lines indicating the arms 144 and 145. The arm 144 which is formed by the C-column is displaced rearwardly from the drive arm 145—the drive is symbolized by an arrow 148 (FIG. 9)—and the operating mechanisms for the roof parts 102 to 104 are operatively connected to the drive arm 145 by way of a drive link 147.

For explaining the design and operation, a support beam 111 has been added in FIGS. 7 and 8 to the intermediate roof part 103 which carries the pivot joints for the connection of operating mechanisms 108 and 110 to the intermediate roof part 103 and also for the support arms 144 and 145 of the support arm operating mechanism 109, which are pivotally connected.

The operating mechanism 108 and 110 for the front and rear roof parts 102 and 104 are four-link operating mechanism or drives. A drive link structure 112 is supported on the intermediate roof part 103. The drive link structure 112 is connected to the operating mechanisms 108 and 110 by actuating links 115 and respectively 116 as will be described below in greater detail with reference to FIG. 9.

The drive link structure 112 comprises a pivot arm 117, which is pivotally supported at a pivot joint 118 on the intermediate roof part 103—symbolically indicated by the support beam 111—and which, in the embodiment shown herein, extends about parallel to the support arms 144 and 145 of the support arm operating mechanism 109. In the lower end area of the pivot arm 117, one end of the drive link 147 is pivotally connected thereto at the pivot joint 121, the other end being connected to the support arm 145 by way of the pivot joint 120. Operating links 122, 123 extend from the pivot arm 117 to the actuating link mechanisms 115 and respectively 116 for the front and rear roof parts 102 and 104, respectively, for actuating the respective roof part operating mechanism 108 and 110.

FIGS. 7 and 8 further show that the roof part operating mechanisms 108 and 110 are four-link operating mechanisms with bases 124 and, respectively, 125, which are formed by the intermediate roof part 103, or respectively, the support beam 111, which extends in the connecting areas for the roof part operating mechanisms 108 and 110 in longitudinal vehicle direction beyond the intermediate roof part 103. The coupling structures of the roof parts 102 and 104 of the four-link operating mechanisms 108 and 110 are designated by the numerals 126 and 127. Of the links 128, 113 and respectively, 130, 114 of the roof part operating mechanisms 108 and 110, preferably the links 113 and 114, which are disposed adjacent the intermediate roof part 103, are the driven links, to which the operating links 122 and 123 are operatively connected.

Figure 9:
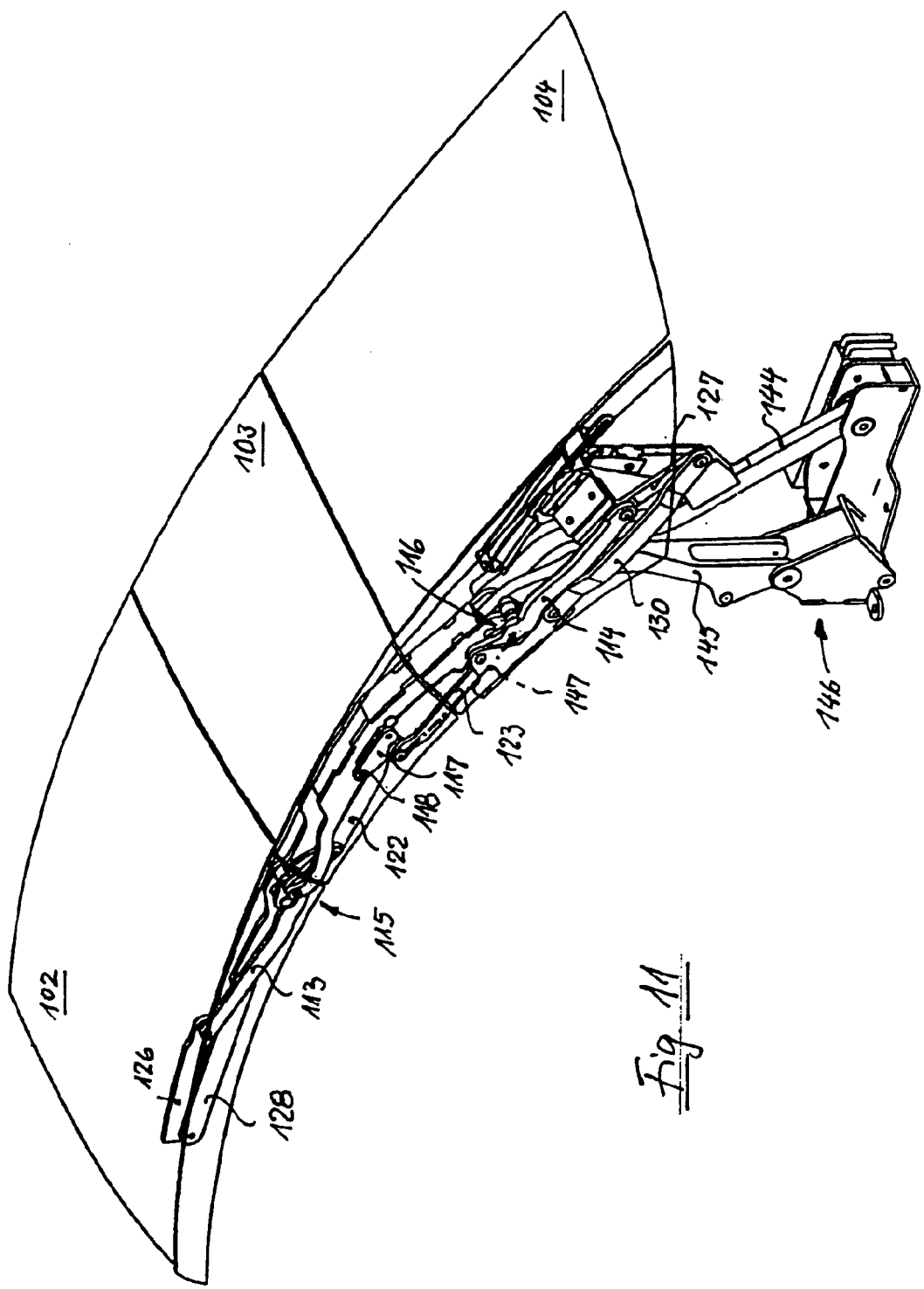
FIG. 9 is a highly abstracted representation wherein, the operating mechanisms between the front and rear roof parts and the intermediate roof part are shown for the closed position of the vehicle roof and wherein also the support arm mechanism is indicated by which the intermediate roof part is movably supported and from which the drive for the front and rear roof parts relative to the intermediate roof part is derived.

FIG. 9 shows that the actuating link structure 115 which is disposed at the transition to the front roof part 102 is a five-link drive structure whereas the actuating link structure 116, which is arranged at the transition to the rear roof part 104 is a crossed over four-link drive structure. The connecting points of the roof part operating mechanisms 108 and 110 and the drive link structure 112 for the intermediate roof part 103 are indicated in FIG. 9 symbolically as stationary relative to the intermediate roof part 103. Particularly the comparison with FIGS. 7 and 8 shows the positions of the individual connecting points which is made clear by the use of the same reference numerals for the individual parts. To facilitate the viewing, in FIG. 9 some of the different links and arms are represented by different lines (double full lines, double lines with one dashed line, dashed lines).

The actuating link structure 115 comprises guide arms 132 and 133, which are pivotally supported on the intermediate roof part 103 and of which the guide arm 132 is formed by one arm of the drive link 113 such that the drive link 113 represents an angled lever. Also the operating link 122 is part of an angled lever including an angled link 134. The operating link 122 is supported on the intermediate roof part 103 by the parallel guide arms 133 and 135, which are both pivotally supported on the intermediate vehicle roof part 103. The guide arm 133 forms also a guide member of the five-link actuating structure 115. The arm 132 and the arm 133 of the operating link 122, which extends along, and is supported on, the intermediate roof part 103, are interconnected by a connecting link 136. During movement of the roof part 102, this connecting link 136 pivots relative to the guide arm 132 and the angled link 134, while transferring the actuating movement for the front roof part 102 from the operating link 122 to the front roof part operating mechanism 108. In the closed position of the roof 104, with the operating link 122 moved backwardly, the lever extends downwardly along the dashed line 157 and in the folded or stacked position of the roof 101 with the operating link 122 moved forwardly, it extends upwardly along the dashed line 158, which lines are symbolically indicated in FIG. 8. During the transfer between the closed and the stacked position of the roof parts, the connecting link 136 pivots about its pivot joint with the arm 132 of the drive link 113 by an angle, which is greater than 180°. In the embodiment shown, this pivot angle is about is about 270°. The angles defined between the connecting link 136 and the guide arm 132 in the two end positions of the roof part 102 are essentially the same and are essentially 90° with a pivot range of the guide arm 132 about its pivotal support joint on the roof part 101 of about 180°.

At the opposite end of the, intermediate roof part 103 is the drive connection to the operating mechanism 110 of the rear roof part 104 by way of the actuating link structure 116, which is in the form of a four-link mechanism. It includes a side-arm 137 extending from the driven arm 114 of the support arm operating mechanism 110 so that also the driven arm 114 of the operating mechanism 110 is in the form of an angled lever. The basis of the actuating link structure 116, which is a four-link mechanism, is formed by the pivot joint 138 of the driven link 114 to the roof part 103 and the pivot joint 139 for the connection of the guide arm 140 to the roof part 103. In the closed position of the roof as shown in FIG. 9, the guide arm 140 extends essentially normal to the side arm 137 and passes by the side arm 137. The end of the guide arm 140 opposite the pivot joint 139 is connected by way of a connector link 141 to the free end of the side arm 137 of the driven arm 114. The respective pivot joints are indicated by the numerals 142 and 143. The operating link 123 extends between the connecting joint 142 of the connector link 141 and the guide arm 140 and is connected, like the operating link 122, to the guide arm 135.

The arrangement of the actuating link structures 115, 116 results in an essentially synchronous displacement movement of the roof parts 102 and 104 with respect to the intermediate roof part 103 wherein, by the arrangement of the various linkages, in the end phases of the displacement movement the speed of the movements is substantially reduced with respect to the speed in the intermediate range of the movement. In FIG. 9, the drive arrangement is shown schematically in a simplified manner, wherein the drive link 147 is connected to the guide arm 135 corresponding to the pivot arm 117 in FIGS. 7 and 8. The respective pivot joint is designated by the numeral 121 and the corresponding connection to the support arm 145, of the support arm operating mechanism 109, which is shown in dashed lines, is indicated by the reference numeral 120.

Figure 10:
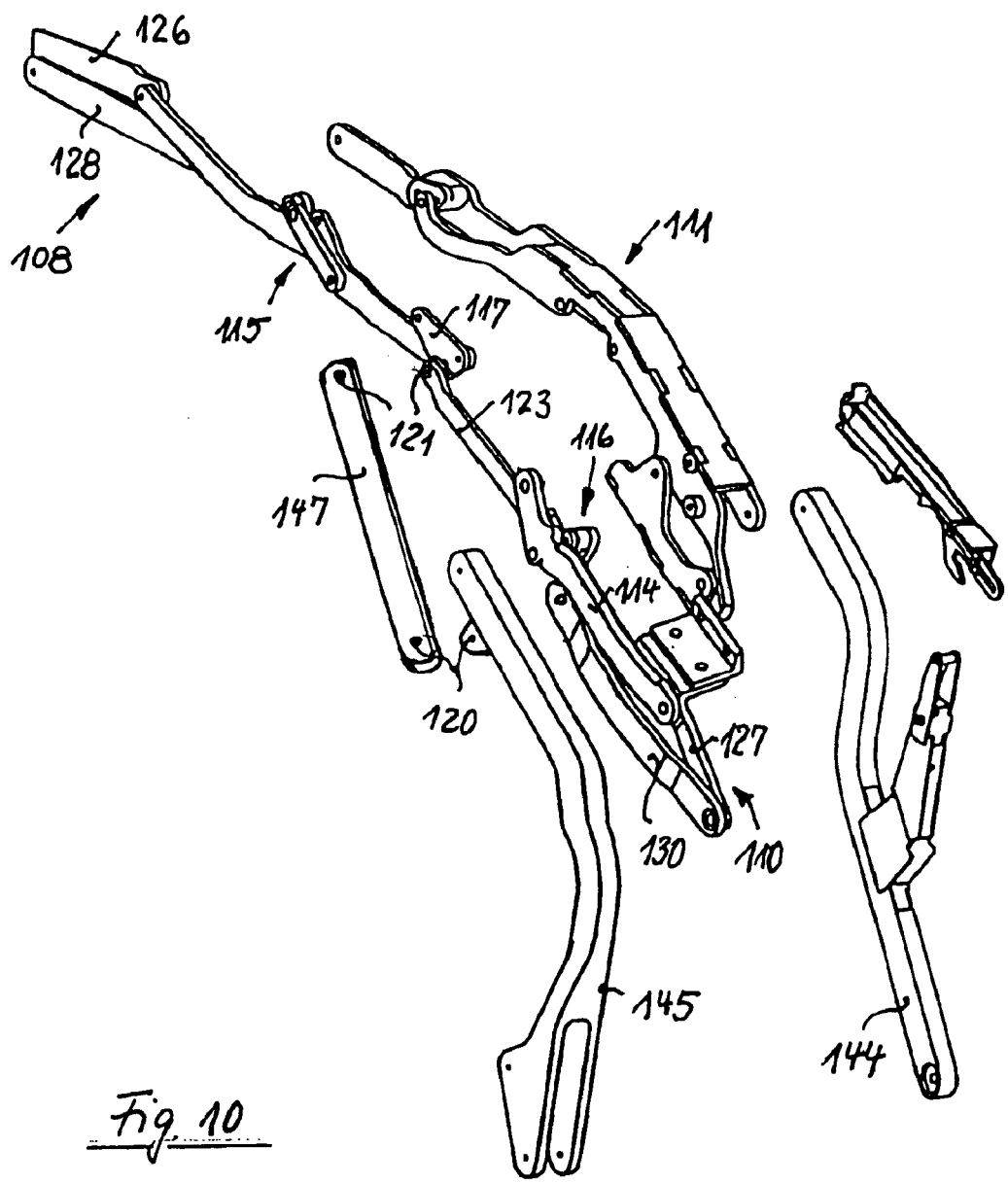
FIG. 10 is an exploded view of the roof operating mechanism.

FIGS. 10 and 11 show the actual construction of the roof operating arrangement formed by the operating mechanisms 108 and 110 and the drive structure 109. In addition, the pivotal support for the C-column arm 144 and the support arm 145 on a console 146 of the vehicle body 100 are shown. The drive for operating the vehicle roof 101 and the roof parts 102 to 104 is provided in the embodiment shown by way of the support arm 145 or, respectively is derived therefrom wherein known drive means which are schematically shown by the arrow 148, for example, a hydraulic cylinder, may be connected to the support arm 145 for actuating, that is, pivoting the support 145.

The drive link 147 is indicated in FIG. 11 only by a dash-dotted line. Its connecting joint 120 to the support arm 145 is not visible—this is shown clearly in the exploded view of FIG. 10. Concerning the other details of FIGS. 10 and 11 reference is made to the description of the earlier figures in connection with the reference numbers.

The use of a common drive for the vehicle roof as such and for the roof parts 102–104 relative to one another results in a simple and relatively inexpensive construction and a reduction of the control expenditure. Furthermore, the intermediate roof part 103 and the drive link arrangement can be of a relatively flat design so that the interior vehicle space is not affected much even during the opening and closing of the roof, particularly since for opening the roof is raised and the front roof part 102 is moved on top of the intermediate roof part 103. In the same way, also the rear roof part 104 is moved over the intermediate roof part so that, also in this process, no intrusion into the interior vehicle space occurs.

What is claimed is:

1. A hardtop vehicle roof for a vehicle body (100) with an interior vehicle space comprising front, intermediate and rear rigid roof parts (102, 103, 104), which are movable between a closed position, in which they are disposed in a longitudinal vehicle direction one behind the other so as to cover the interior vehicle space, and a storage position, in which the roof parts (102, 103, 104) are removed from said interior vehicle space, said rigid roof parts being jointly supported on said vehicle body (100) by way of said intermediate roof part (103), a roof support and operating mechanism (109) mounted on said vehicle body (100) and connected to said intermediate roof part (103), and a roof part actuating mechanism (112) including actuating link structures (115, 116) disposed between said intermediate roof part (103) and said front and rear roof parts (102, 104) for supporting said front and rear roof parts (102, 104) on said intermediate roof part (103), means (148) for actuating said roof support and operating mechanism (109), and operating link means (122, 123) interconnecting said actuating link structures (115, 116) for actuating said roof support and operating mechanism and said actuating link structures (115, 116) for moving said front and rear roof parts in stacked relationship with said intermediate roof part (103) during opening of said roof such that, in said storage position, said intermediate roof part (103) is disposed in a roof part packet at the bottom and said front and rear roof parts (102, 104) are disposed above said intermediate roof part (103), said operating link means including a pivot arm (117) pivotally supported on said intermediate roof part (103) and operating links (122, 123) connected to said pivot arm and extending therefrom in opposite directions to said actuating link structures (115, 116) for moving said front and rear roof parts (102, 104) relative to said intermediate roof part (103).

2. A hardtop vehicle roof according to claim 1, wherein said roof support and operating mechanism (109) includes support arms (144, 145), and a drive link (147) extends between one of said support arms (145) and said pivot arm (117) for operating said actuating link structures (115, 116) upon movement of said intermediate roof part, said drive link (147) and said support arm (145) connected thereto extending in the closed position of said roof upwardly and forwardly along said roof.

3. A hardtop vehicle roof according to claim 2, wherein, in the closed position of the vehicle roof, said drive link (147) and said pivot arm (117) are forwardly inclined.

4. A hardtop vehicle roof according to claim 2, wherein said pivot arm (117) is pivotally supported on said intermediate roof part (103) by a pivot joint (118), which, in the closed position of the vehicle roof (101), is displaced from a pivot joint (121) by which said drive link (147) is connected to said pivot arm (117).

5. A hardtop vehicle roof according to claim 1, wherein said pivot arm (117) is pivotally supported so as to be pivotable in a vertical plane extending in the longitudinal direction of said vehicle.

6. A hardtop vehicle roof according to claim 1, wherein said actuating mechanism (112) includes said actuating link structures (115, 116) in the transition areas to the front and rear roof parts (102, 104).

7. A hardtop vehicle roof according to claim 6, wherein one of said actuating link structures (116) is a four-link operating mechanism.

8. A hardtop vehicle roof according to claim 7, wherein said four-link operating mechanism for said rear roof part has a basis which is stationary with respect to the intermediate roof part (103).

9. A hardtop vehicle roof according to claim 8, wherein said actuating link structure (116) for said rear roof part (104) is connected to said actuating mechanism by way of an operating link (123), a guide arm (140), a connector link (141) and a side arm (137) and said connector link (141) cross the basis line of said four-link structure (116).

10. A hardtop vehicle roof according to claim 9, wherein said side arm (137) extends from said drive arm (114) of the operating mechanism (110) of said rear roof part (104).

11. A hardtop vehicle roof according to claim 1, wherein said actuating link structure (115) for said front roof part (102) is a five-link mechanism.

12. A hardtop vehicle roof according to claim 11, wherein said five-link mechanism has a basis which is stationary with respect to the intermediate roof part (103).

13. A hardtop vehicle roof according to claim 12, wherein said five link mechanism (108) includes a drive link (113) and a guide arm (132), which is part of said drive link (113) that is connected to said front roof part (102).

14. A hardtop vehicle roof according to claim 13, wherein said five link operating mechanism (108) includes another guide arm (133) to which an operating link (122) of the drive link structure (112) interconnecting the front and rear roof part operating mechanism (112) is connected.

15. A hardtop vehicle roof according to claim 14, wherein said actuating mechanism (112) includes an operating link (122) with an extension (134) which is guided by a guide arm (133) pivotally supported on said intermediate roof part (103).

16. A hardtop vehicle roof according to claim 1, wherein, in said roof part packet, said front roof part is disposed between the intermediate roof part and the rear roof part, which is disposed on top of the front roof part.

17. A hardtop vehicle roof according to claim 1, wherein, in said roof part packet, said rear roof part is disposed between said intermediate roof part and the front roof part (102) which is disposed on top.

18. A hardtop vehicle roof according to claim 1, wherein in said roof part packet, the outside of each roof part faces upwardly.

* * * * *